(12) United States Patent
Kwan et al.

(10) Patent No.: US 6,179,907 B1
(45) Date of Patent: *Jan. 30, 2001

(54) BLACK IRON OXIDE WITH IMPROVED HEAT STABILITY AND METHOD OF PREPARING SAME

(75) Inventors: Wing Sum Vincent Kwan, Deerfield; Lily W. Tai, Chicago, both of IL (US)

(73) Assignee: Marconi Data Systems Inc., Wood Dale, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/087,049

(22) Filed: May 29, 1998

(51) Int. Cl.$^7$ .................................... C09C 1/22
(52) U.S. Cl. .......................... 106/456; 106/457; 106/460
(58) Field of Search ................................ 106/456, 457, 106/460; 423/634

(56) References Cited

U.S. PATENT DOCUMENTS

| | | | |
|---|---|---|---|
| 3,348,959 | 10/1967 | Csonka et al. | 106/471 |
| 3,398,113 | 8/1968 | Godshalk et al. | 524/197 |
| 3,453,130 | 7/1969 | Feld | 106/447 |
| 4,160,760 | 7/1979 | Carr et al. | 523/333 |
| 4,277,288 | 7/1981 | Lawrence et al. | 106/413 |
| 4,491,619 | 1/1985 | Biermann | 428/403 |
| 4,545,821 | 10/1985 | Rau et al. | 106/418 |
| 4,913,063 | 4/1990 | Jonas et al. | 106/413 |
| 5,401,313 * | 3/1995 | Supplee et al. | 106/712 |
| 5,420,317 | 5/1995 | Laufenberg et al. | 554/163 |
| 5,501,732 | 3/1996 | Niedenzu et al. | 106/445 |
| 5,849,074 | 12/1998 | Kwan | 106/460 |
| 5,855,661 | 1/1999 | Kwan | 106/444 |
| 5,865,885 | 2/1999 | Kwan | 106/460 |
| 5,922,121 | 7/1999 | Kwan | 106/460 |

FOREIGN PATENT DOCUMENTS

| | | |
|---|---|---|
| 1959233 | 6/1970 | (DE) . |
| 2043629 | 3/1972 | (DE) . |
| 2313073 | 9/1974 | (DE) . |
| 0707051 | 4/1996 | (EP) . |
| 2281410 | 3/1976 | (FR) . |
| 2673838 | 9/1992 | (FR) . |
| 1104939 | 3/1968 | (GB) . |
| 1287576 | 8/1972 | (GB) . |
| 1460315 | 1/1977 | (GB) . |
| 1494746 | 12/1977 | (GB) . |
| 51-082317 | 7/1976 | (JP) . |
| 59-170130 | 9/1984 | (JP) . |
| 59-170131 | 9/1984 | (JP) . |
| 60-079068 | 5/1985 | (JP) . |
| 62-267368 | 11/1987 | (JP) ..................... 106/460 |
| 6115945 | 4/1994 | (JP) . |
| 6145025 | 5/1994 | (JP) . |
| 07053910 | 2/1995 | (JP) . |
| 07165986 | 6/1995 | (JP) . |
| 8109022 | 4/1996 | (JP) . |
| WO 97 12944 | 10/1997 | (WO) . |

\* cited by examiner

*Primary Examiner*—Paul Marcantoni
(74) *Attorney, Agent, or Firm*—Leydig, Voit & Mayer, Ltd.

(57) ABSTRACT

A process of using silicate and alkylphenol to surface-modify black iron oxide. The modified pigment shows superior heat stability. The process may be applied on a native slurry, hence providing a simple, economical and non-invasive method to modify black iron oxide on an industrial scale. The resultant black iron oxide may be used in lieu of mixed metal oxide in the majority of thermal applications.

13 Claims, No Drawings

BLACK IRON OXIDE WITH IMPROVED HEAT STABILITY AND METHOD OF PREPARING SAME

FIELD OF THE INVENTION

The present invention relates to black iron oxide pigments that are stable at high temperatures and to a method of making such pigments.

BACKGROUND OF THE INVENTION

There are few black colorants that may be used in high temperature applications, such as concrete or fiber cement. Black mixed metal oxides like manganese ferrite have been the pigment of choice in the past for such applications. Although this type of pigment enjoys high heat stability (up to 800–1000° C.), it is expensive to produce and shows inferior tinting strength. Moreover, there are rising environmental concerns regarding the use of heavy metal ions in the manufacturing process for such pigments. In reality, the temperature requirement of the majority of these high temperature applications does not demand the high degree of temperature tolerance provided by such pigments.

Thus there exists a need for an alternative, simple, low cost black pigment for such applications.

Black iron oxide has always been considered as a suitable alternative to mixed metal oxides. It is relatively inexpensive to produce and exhibits much higher tinting strength when compared to mixed metal oxides. However, black iron oxide is not currently used in applications where high temperature is involved because of its instability towards heat and oxidation. When exposed to heat, iron (II) oxide, which is responsible for the black color in black iron oxide, is known to be oxidized to iron (III) oxide, which is red. This oxidation process is caused by oxygen transfer to the surface, and the process is facilitated by heat. To increase the heat stability of black iron oxide, oxygen supply to the oxide surface must to be diminished. This can be achieved by placing a protective coating onto the surface of the oxide.

There are some examples in prior art of such coatings. Unfortunately these coatings have their limitations. U.S. patent application Ser. Nos. 08/684,417 and 08/653,357 reveal the use of alkylphenols as surface coatings on iron oxide. These surface-bound organic molecules are effective in lowering the supply of oxygen onto the iron oxide surface and hence enhances the resistance of the iron oxide to heat. However, the alkylphenol molecules render the pigment so hydrophobic that they may not be suitable for use in applications that employ very polar media like alkaline cement.

U.S. Pat. No. 4,975,214 describes the use of silica in the range of 0.2–0.5 weight percent in the synthesis of magnetic iron oxide. U.S. Pat. No. 5,718,755 also discusses the use of an iron oxide coating with 0.5–2% weight percent of silica. However, it is shown that even a surface coating of 4 percent (by weight) of silica on the pigment alone, will not significantly raise the onset temperature of oxidation for the iron oxide.

European patent EP 305,819 discloses the preparation of a ferromagnetic metal powder comprising a ferromagnetic metal particle composed mainly of iron, a silicon compound layer formed on the surface of the ferromagnetic metal particle in such an amount that the amount of silicon is 0.1 percent to 1 percent by weight based on iron in the metal particle, and a layer containing a non-ferrous transitional metal element compound, which is formed on the silicon compound layer. In accordance with this patent, the final product is a metal powder, and not an iron oxide. Moreover, as shown in latter part of the patent, a dosage of 1 percent is not enough to raise the onset temperature significantly. Furthermore, the preparation procedure for this powder is lengthy, inefficient and involves heavy metal ion like cobalt.

United Kingdom Patent No. 1,494,746 discloses the use of an inner coating of silica and an outer coating of an aromatic carboxylic acid or salt thereof onto the surface of lead chrome pigment to increase its heat stability. However, such a method demands high dosage (at least 14 weight percent silica and 17–34 weight percent salt of an aromatic carboxylic acid) of the individual coatings. Moreover, the procedure involves the complicated sequence of pH adjustment and lengthy mixing time (up to 3 hours in one single step). Furthermore, the process is only applicable to a washed slurry. In other words, washed pigment must be re-dispersed before such a procedure can be applied. All of these requirements cause disruption in the manufacturing process and add tremendous cost to the final pigment.

Accordingly, a goal of the present invention is to increase the heat stability of black iron oxide; preferably, using a modifying agent that is inexpensive. Further, the modification process should be simple, fast and non-invasive towards the manufacturing process.

SUMMARY OF THE INVENTION

A method of improving the heat stability of black iron oxide pigment is provided that comprises contacting an aqueous slurry of black iron oxide pigment with a water-soluble silicate, in an amount from about 2 to about 50 percent, preferably from about 2 to about 20 percent, based on the weight of the pigment, at a temperature from about 40° C. to about 90° C., and subsequently contacting the slurry with an alkylphenol in an amount from about 0.1 to about 5 percent, preferably from about 0.1 to about 2 percent, based on the weight of the pigment, at a temperature from about 40° C. to about 90° C.

The present invention also provides a black iron oxide pigment having a coating comprising a silicate and an alkylphenol. Further, the present invention provides black iron oxide pigment having improved heat stability. Onset temperature, as indicated in latter part of the patent, is actually the degradation temperature.

DESCRIPTION OF THE PREFERRED EMBODIMENTS

General Method

An aqueous slurry of black iron pigment is first heated to about 60° C. and contacted with a sufficient quantity of a solution of silicate to realize about a 4 wt % coating of silica on the pigment surface. The silicate solution may contain, for example, about 19 percent sodium silicate, by weight. Stirring is continued for about 10 minutes. The alkylphenol, such as dinonylphenol, is then added to the mixture and the mixing process is continued for about 10 to about 30 minutes. The pigment is then filtered, as by using a Buchner funnel with a Whatman #1 filter paper. The pigment is then washed with tap water or distilled water until the conductivity of the filtrate falls down to background value. The pigment is then dried as in a convection oven, as at 90° C. overnight. The dried pigment is pulverized, as by using a coffee mill before subjecting it to thermal evaluation. Recovery and washing are required unless a slurry obtained from re-dispersion of dry pigment or washed press-cake is used.

Specification of Black Iron Oxide

The black iron oxide may be either natural black iron oxide (i.e. natural magnetite) or synthetic black iron oxide from known synthetic processes (e.g. precipitation or Aniline Process or calcination of yellow iron oxide under a reducing gas medium). The black iron oxide can be cubical, spherical or acicular. Usual average particle size can extend from about 0.5 to about 2 microns when dispersed. However, finely ground natural black magnetite can have sizes below 0.1 micron when dispersed. The black iron oxide is inherently magnetic, but the magnetic strength can stretch from 60 to 300 Oe. The usual ratio of $FeO/Fe_2O_3$ is from 2/8 to 3/7 (w/w), depending on the blackness of the pigment.

Specification of Slurry

A suitable slurry will be one obtained immediately after the synthesis of the black iron oxide pigment has been completed, or, less desirably, as obtained via re-dispersion of washed presscake or dried powder. The slurry should have a pigment content of about 10 to about 50 percent by weight, preferable between about 10 and about 30 percent. The conductivity of the slurry may be as high as about 18,000 micro S.

A native slurry, as preferably used in the present invention, is the slurry obtained in the production line after completion of the synthetic process and before the filtration step. This slurry is usually contaminated with salts (e.g. sulphate ions in the precipitation process) and sometimes with unreacted raw materials (e.g. unreacted ion ore in the aniline process).

Specification of Silicate and Alkylphenol

A suitable silicate should be one available in solution form. The cation can be sodium, aluminum or other cations that render the silicate soluble. The pH of the silicate usually is within such a range that the silicate remains soluble, preferably above pH 10. The ratio of silicon dioxide to sodium oxide usually is from about 2.5 to about 3.2. A silicate of low viscosity (less than 100 centipoise) is preferable for efficient distribution in the slurry. With more efficient mixing, ore viscous silicate solutions of up to 70,000 centipoise may be used. An example of a useful silicate is Silicate RU supplied by PG Corporation (Valley Forge, PA). The silicate is present in solution at about 37 percent by weight.

Alkylphenol compounds used in the present invention comprise a family of compounds in which one or two alkyl "tails" are added to phenol. In general, each alkyl group may be any $C_5$ to $C_{24}$ alkyl group, which may also contain some unsaturation. Nonylphenols, such as (4-nonyl)phenol and (2,4-dinonyl)phenol are preferred among the alkylphenol compounds. These compounds have one or two nine-carbon alkyl tails, respectively. Other isomers of nonylphenol, including those having a branched tail, and including other positional isomers, may be used, as may mixtures of alkylphenol compounds or isomers. Additional mono- or dialkylphenol compounds suitable for use in the present invention include, for example, compounds with shorter tails, such as pentylphenol and hexylphenol, and those with longer tails, such as decylphenol, undecylphenol, dodecylphenol, and so forth.

In order that the invention may be more fully understood, the following Examples are given by way of illustration only. Parts and percentages are by weight unless otherwise stated.

EXAMPLE 1

To 407 grams of a well-stirred, heated native slurry (pigment content is 21.2%) of black iron oxide was added 11.78 grams of sodium silicate (solid content: 37%) in an alkaline solution. 0.87 grams (1% by weight of iron oxide) of dinonylphenol was added to the mixture after 5 minutes. The mixing was maintained between 90° and 95° C. for another thirty minutes. The pigment was then filtered using a Buchner funnel equipped with a Whatman filter paper #1. The pigment was then washed, dried and pulverized using a coffee mill before testing.

In order to assess the importance of each component of the coatings and differentiate it from other coatings, comparative Example 2 to 4 here performed.

COMPARATIVE EXAMPLE 2

A procedure similar to that in Example 1 was followed, except that dinonylphenol was not added.

COMPARATIVE EXAMPLE 3

A procedure similar to that in Example 1 was followed, except that silicate was not added.

COMPARATIVE EXAMPLE 4

A procedure similar to that in Example 1 was followed except that dinonylphenol was replaced with sodium salicylate.

Evaluation of Thermal Stability of Modifed Black Iron Oxide

Black iron oxide is a complex of iron (II) oxide and iron (III) oxide. It decomposes mainly via oxidation. Upon oxidation, iron (II) oxide in black iron oxide is oxidized by oxygen in air to iron (III) oxide according to equation 1:

$$4\ FeO + O_2 \rightarrow 2\ Fe_2O_3 \tag{Eq 1}$$

This transformation produces two changes. First, there is an increase in weight. Second, the color of iron oxide will change from black to red. Accordingly, the thermal stability of the iron oxide can be assessed by either monitoring the weight change or color change.

The first method is thermogravimetric analysis (TGA). Two modes can be used under this method. The first mode is a scanning mode. In essence, a known quantity of material is put into an enclosed chamber. The weight of the material is then monitored as a function of the chamber temperature. Under this mode, the thermal stability can be assessed via two parameters. The first one is the onset temperature, or degradation temperature, which is defined to be the temperature at which the weight of the iron oxide starts to increase. The second parameter is the degree of oxidation, which is given by the maximum weight increase during the oxidation process. A thermally stable iron oxide should have a high onset temperature and a low degree of oxidation.

The second mode is an isothermal mode. In this mode, the weight of the pigment is monitored as a function of time when the pigment is put in air at a constant temperature. The weight of the pigment is then plotted against the time elapsed, and the first derivative of such a plot will yield the rate of oxidation at a certain temperature. A thermally stable pigment will exhibit a lower rate of weight gain, and ideally, a zero rate of weight gain. A detailed procedure for both modes is described in Example 5.

EXAMPLE 5

TGA experiments were performed on a TGA 2950 Thermogravimetric Analyzer (TA Instruments, New Castle, Del.). The system was first allowed to equilibrate with the purge gas for 20 minutes. Analysis of iron oxide was performed under dry air condition (purge gas for furnace) and nitrogen—Grade 4.8 (purge gas for microbalance chamber). The desired temperature program method at monitoring the weight, either as a function of temperature in the scanning mode (e.g. 10° C./min to 500° C.) or as function of time in the isothermal mode (e.g. 200° C. for 30 min.), was then chosen. To start an experiment, a 100 μL platinum pan was placed onto the sample platform. The furnace was then raised, and the empty pan was weighed and tared automatically. The iron oxide sample, with the optimal sample size being about 10–20 mg, was then loaded onto the pan. The pan was then placed back onto the designated location on the platform. The furnace was closed and the weight of the sample was allowed to stabilize before the temperature profile commenced. Raw data is then stored in files. The weight of the sample is later plotted against temperature or time. To measure the rate of weight loss, the first derivative of weight-time profile was also plotted against time. Such plots of the samples were overlaid with the unmodified sample for comparison.

The sample and all comparative examples are subjected to evaluation according to Example 5 and the results are tabulated in Table 1.

TABLE 1

Onset Temperature, Degree of Oxidation, and Rate of Oxidation of Pigments in Examples 1–4 as Evaluated by TGA (Note 1).

| Example | 1 | 2 | 3 | 4 | Control |
|---|---|---|---|---|---|
| Presence of Silicate | + | + | − | + | − |
| Presence of Alkylphenol | + | − | + | − | − |
| Onset Temp. (Note 2) | 292 | 160 | 160 | 150 | 119 |
| Degree of Oxidation (%) | +1.72 | +2.25 | +2.1 | +2.28 | +2.07 |
| Rate of Oxidation (Note 3) | 0.0 | +0.05 | +0.28 | +0.05 | +0.81 |

Note 1. Onset temperature and degree of oxidation of pigments were obtained in scanning mode, whereas the rate of oxidation of pigments was measured in the isothermal mode. All of the experiments were carried out according to Example 5. For the second row and third row, a "+" sign means the presence of such material and a "−" sign indicates the absence of such material. The control is an unmodified pigment.
Note 2. The onset temperatures are measured in degrees C.
Note 3. The degrees of oxidation for each example are measured in isothermal mode and are reported as percentage change per minute.

Table 1 clearly demonstrates the importance of the presence of both alkylphenol and silicate. Without the coexistence of both species in the coating, the pigment demonstrates a much lower onset temperature, higher degree of oxidation and much faster rate of oxidation in the isothermal mode (Comparative Examples 2–4). These findings emphasize the surprising result achieved using these two components together in modifying iron oxide for thermal application. By comparing with the control sample, the combination of silicate and alkylphenol treatment raises the onset temperature by more than 150° C.

The second method of evaluating temperature stability is color evaluation as a function of time of exposure. This may be considered to be a more realistic test for the thermal application, as the color change, if any, will be revealed as in the actual manufacturing procedure. In summary, a measured quantity of pigment is placed in an oven set at a fixed temperature for a designated time of residence. The pigment is then mixed with a tinting agent to form an ink. The inks from the pigment with and without the heat exposure will then be drawn down side by side. Color evaluation will be performed on the dried films and the color difference between the heated and unheated pigment will be calculated. The delta values of more importance to heat resistance evaluation are delta L, which is a measure of darkness; and delta a, which is a measure of the redness of the pigment. Delta E measures, on the other hand, the sum of difference of darkness, blueness and redness. In general, a smaller delta a, delta L and delta E value indicate greater heat stability. A typical procedure is depicted in Example 6 and the color evaluation for the various pigments is tabulated in Table 2.

EXAMPLE 6

1.0 gram of modified pigment was placed into an aluminum dish. The dish was placed into a convection oven set at 200° C. for 30 minutes. This is referred to as the heated pigment.

0.1 gram of the heated pigment was mixed with 1.0 gram of a tinting agent (NPIRI Tinting white, NPIRI, Hasbrouck Heights, N.J.). The mixture was subjected to hand milling. The above procedure was repeated for the unheated pigment. The inks for the heated and unheated pigment were then drawn down side-by-side onto a non-coated stock (The Leneta Company, Mahwah, N.J.) and air-dried. The dried films were subjected to color evaluation using a HunterLab Miniscan XE color spectrometer (Hunter Associates, Reston, Va.). The difference in color between the heated and unheated sample was calculated and compared in term of delta L, delta a, delta b, and delta E.

TABLE 2

Effect of various combination of treatments on the color changes of black iron oxide at 200° C.

| Example | 1 | 2 | 4 | Control |
|---|---|---|---|---|
| Delta L | 0.36 | 0.33 | −0.6 | 10.48 |
| Delta a | 0.00 | 0.12 | 0.13 | 6.48 |
| Delta b | 0.01 | 0.41 | −0.12 | 8.24 |
| Delta E | 0.36 | 0.54 | 0.63 | 14.80 |

Note 1. Pigment was tested according to Example 6. The temperature of the oven was 200° C. The residence time was 30 minutes. The delta L value was determined by L(heated)-L(unheated), and the other delta values were determined accordingly. Delta E is given by $((\text{Delta L})^2 + (\text{Delta a})^2 + (\text{Delta b})^2)^{1/2}$.

As seen in Table 2, only the combination of alkylphenol and silicate treatment provides the black iron oxide with the lowest shift in redness (delta a), and overall color (delta E). Actually, the control pigment had turned totally red under such conditions. Moreover, the relative magnitude of change in overall color (delta E) among various pigments echoes that of the rate of oxidation as determined by TGA.

In order to optimize the formulation of the treatment, various concentration of alkylphenol and silicate were tried, as described in Example 7. The effect of such changes has been evaluated by TGA and the results are listed in Table 3.

EXAMPLE 7

The procedure in Example 1 was followed to prepare the black iron oxide except that various amount of dinonylphenol and silicate were used. The amounts used are shown in Table 3.

TABLE 3

Effect of changing concentration of alkylphenol and silicate on the heat stability of black iron oxide (Note 1).

| Entry | 7a | 1 | 7a | 7b |
|---|---|---|---|---|
| Amount of silicate (%) | 16 | 4 | 1.2 | 0.8 |
| Amount of Alkylphenol | 1 | 1 | 1 | 1 |
| Onset Temp. (Note 2) | 276 | 295 | 214 | 200 |
| Degree of Oxidation (Note 3) | +1.11 | +1.72 | +1.83 | +1.79 |

Note 1. The amount of silicate and dinonylphenol used are in weight percent of the dry weight of the pigment.
Note 2. Reported in degrees C.
Note 3. Reported in percent weight gain.

A general observation that can be made from the data in Table 3 is that an increase in the amount of silicate increases the onset temperature and reduces the degree of oxidation of the modified black iron oxide. However, the onset temperature achieved by adding 4% sodium silicate to the oxide seems not to follow this general observation. Increasing the amount of silicate was observed to increase the onset temperature and decrease the degree of oxidation. However, for this particular combination of alkylphenol and silicate, the amount of silicate added had to be in excess of 4% by weight to achieve a significant reduction in oxidation. These values will vary depending upon the particular silicate and alkylphenol employed.

What is claimed:

1. A method of improving the heat stability of black iron oxide pigment, comprising contacting an aqueous slurry of black iron oxide pigment with a water-soluble silicate, in an amount from about 2 to about 50 percent, based on the weight of the pigment, at a temperature from about 40° C. to about 90° C., and subsequently contacting the slurry with an alkylphenol in an amount from about 0.1 to about 5 percent, based on the weight of the pigment, at a temperature from about 40° C. to about 90° C.

2. The method of claim 1 wherein the amount of silicate is from about 2 to about 20 percent, based on the weight of the pigment.

3. The method of claim 1 wherein the amount of alkylphenol is from about 0.1 to about 2 percent, based on the weight of the pigment.

4. The method of claim 1 wherein the water soluble silicate is sodium silicate.

5. The method of claim 1 wherein the alkylphenol is dinonylphenol.

6. The method of claim 1 further comprising recovering the pigment.

7. The method of claim 6 further comprising washing the recovered pigment.

8. The method of claim 1 wherein the aqueous slurry of black iron oxide pigment is a native slurry.

9. The method of claim 8 wherein the water soluble silicate is sodium silicate and the alkylphenol is dinonylphenol.

10. The method of claim 9 wherein the amount of sodium silicate is from about 2 to about 20 percent and the amount of dinonylphenol is from about 0.1 to about 2 percent, based on the weight of the pigment.

11. A black iron oxide pigment having a surface coating comprising a silicate and an alkylphenol.

12. The pigment of claim 11 wherein the silicate is sodium silicate and the alkylphenol is dinonylphenol.

13. The pigment of claim 12 wherein the amount of sodium silicate is from about 2 to about 20 percent and the amount of dinonylphenol is from about 0.1 to about 2 percent, based on the weight of the pigment.

* * * * *